(12) United States Patent
Huang et al.

(10) Patent No.: US 7,864,448 B2
(45) Date of Patent: Jan. 4, 2011

(54) LENS DEVICE

(75) Inventors: Tun-Kuei Huang, Taichung (TW);
Chung-Tzer Chen, Taichung (TW);
Chun-Yu Hsueh, Taichung (TW);
Jia-Lun He, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 421 days.

(21) Appl. No.: 12/136,178

(22) Filed: Jun. 10, 2008

(65) Prior Publication Data
US 2008/0310034 A1 Dec. 18, 2008

(30) Foreign Application Priority Data
Jun. 14, 2007 (TW) .............................. 96121536 A

(51) Int. Cl.
*G02B 15/14* (2006.01)
*G02B 7/02* (2006.01)
*G03B 17/00* (2006.01)
*H04N 5/225* (2006.01)

(52) U.S. Cl. ....................... 359/704; 359/822; 396/542; 348/376

(58) Field of Classification Search ......... 359/703–704, 359/808–809, 811, 818–819, 822; 396/529, 396/532, 535, 542; 348/208.99, 294, 335, 348/340, 373–374, 376
See application file for complete search history.

(56) References Cited

U.S. PATENT DOCUMENTS

| 6,069,745 A * | 5/2000 | Fujii et al. | ................... 359/694 |
| 2001/0026682 A1 * | 10/2001 | Kabe | ........................... 396/72 |

* cited by examiner

*Primary Examiner*—Scott J Sugarman
*Assistant Examiner*—Dawayne A Pinkney
(74) *Attorney, Agent, or Firm*—Trop, Pruner & Hu, P.C.

(57) ABSTRACT

A lens device includes a seat unit having an image sensing component, a first barrel unit, a first lens module coupled to the first barrel unit, and a second lens module mounted on the seat unit. When the first barrel unit moves toward the seat unit along an optical axis, the first lens module moves in radial directions via a first guide mechanism such that a first lens unit is misaligned with the image sensing component relative to the optical axis, while the second lens module is driven to rotate via a second guide mechanism such that a second lens unit is misaligned with the image sensing component. The lens device further includes a first biasing unit for biasing the first lens module to a first shooting position, and a second biasing unit for biasing the second lens module to a second shooting position.

14 Claims, 19 Drawing Sheets

US 7,864,448 B2

LENS DEVICE

CROSS-REFERENCE TO RELATED APPLICATION

This application claims priority of Taiwanese Application No. 096121536, filed on Jun. 14, 2007.

BACKGROUND OF THE INVENTION

1. Field of the Invention

The invention relates to a lens device, more particularly to a retractable lens device.

2. Description of the Related Art

Taiwanese Patent Publication No. I 229231 discloses a conventional lens device adapted for use with a camera (not shown). FIGS. 1, 2 and 3 illustrate some elements of the conventional lens device 1 disclosed therein.

The conventional lens device 1 comprises a base plate 11, a cam post 12 extending from the base plate 11 and formed with an inclined cam surface 121, a first lens module 13, a second lens module 14, and a lens barrel 15. The first lens module 13 is mounted pivotally on the lens barrel 15, is surrounded by the lens barrel 15, and has a first lens unit 130, a pivot portion 131, a guide block 132 abutting against the cam surface 121, and a torsion spring 133.

When the camera is turned off, the lens barrel 15 is driven to move toward the base plate 11 along an optical axis (Z1), and the first lens module 13 pivots about the pivot portion 131 while the guide block 132 slides on the cam surface 121, such that the first lens module 13 rotates to a retreating position (not shown) where the first lens unit 130 is not disposed on the optical axis (Z1), and the torsion spring 133 accumulates a restoring force. On the contrary, when the camera is turned on, the lens barrel 15 is driven to move away from the base plate 11, and the restoring force of the torsion spring 133 biases the first lens module 13 to rotate to a shooting position (see FIG. 3) where the first lens unit 130 is disposed on the optical axis (Z1). The movement of the first lens module 13 makes room for the lens barrel 15 to move as close as possible to the base plate 11 along the optical axis (Z1), thereby retracting the conventional lens device 1 when the camera is turned off.

However, since the second lens module 14 is secured on the base plate 11, it can not move to make extra room for further retracting of the conventional lens device 1.

SUMMARY OF THE INVENTION

Therefore, the object of the present invention is to provide a lens device having a thinner size after retraction.

Accordingly, a lens device of the present invention comprises a seat unit, a first barrel unit, first and second lens modules, first and second guide mechanisms, and first and second biasing units. The seat unit has an image sensing component with an optical axis disposed thereon. The first barrel unit is movable relative to the seat unit along the optical axis between an extended position, where the first barrel unit is distal from the image sensing component, and a retracted position, where the first barrel unit is proximate to the image sensing component. The first lens module is coupled slidably to the first barrel unit and has a first lens unit. The first lens module is movable in radial directions relative to the optical axis between a first shooting position, where the first lens unit is aligned with the image sensing component along the optical axis, and a first retreating position, where the first lens unit is misaligned with the image sensing component relative to the optical axis. The first guide mechanism is provided on the seat unit and the first lens module for driving movement of the first lens module from the first shooting position to the first retreating position when the first barrel unit moves from the extended position to the retracted position. The first biasing unit is coupled between the first barrel unit and the first lens module for biasing the first lens module to the first shooting position. The second lens module is mounted pivotally on the seat unit, has a second lens unit, and is rotatable between a second shooting position, where the second lens unit is aligned with the image sensing component along the optical axis, and a second retreating position, where the second lens unit is misaligned with the image sensing component relative to the optical axis. The second guide mechanism is provided on the first barrel unit and the second lens module for driving rotation of the second lens module from the second shooting position to the second retreating position when the first barrel unit moves from the extended position to the retracted position. The second biasing unit is coupled to the second lens module for biasing the second lens module to the second shooting position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
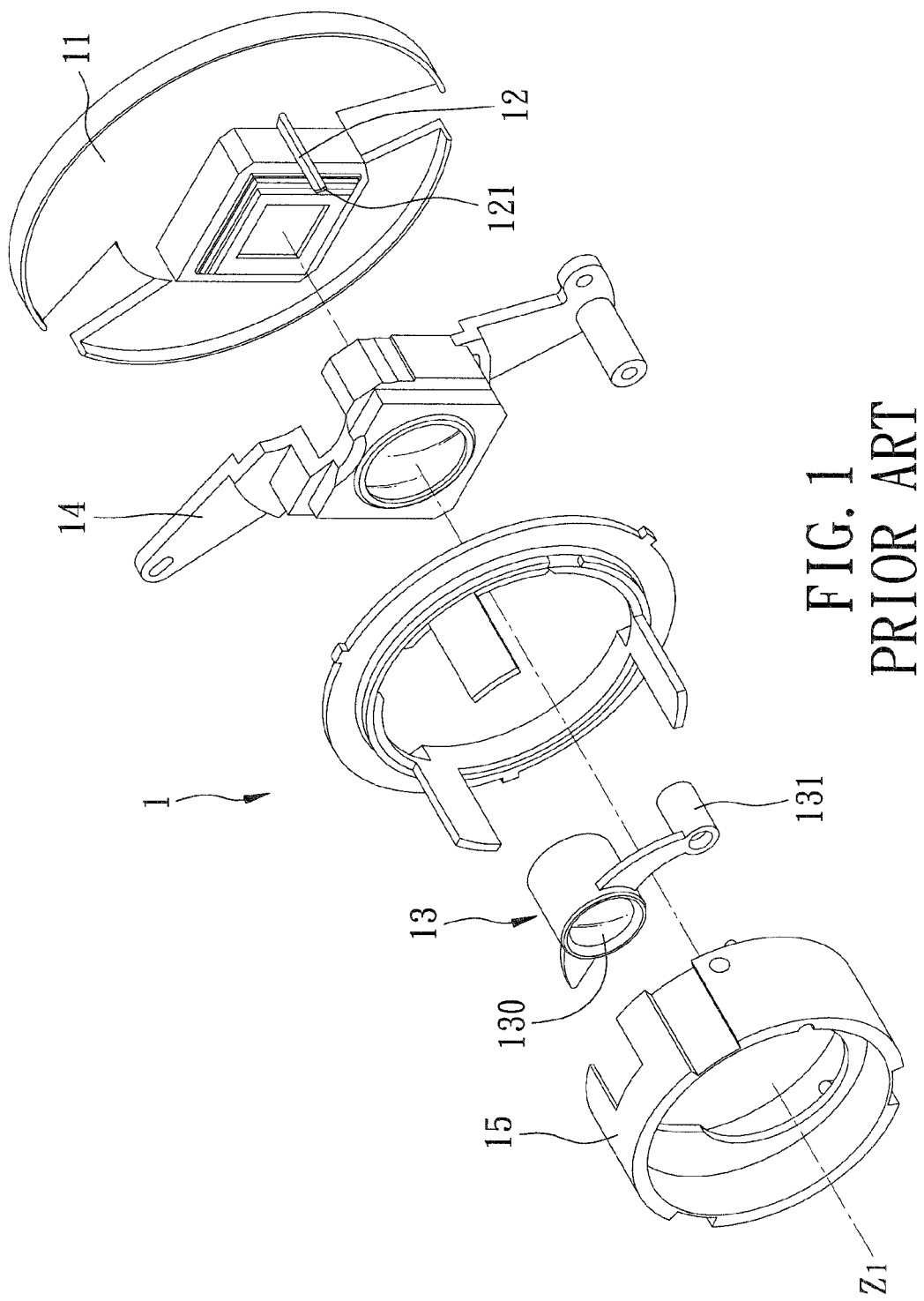
FIG. 1 is a fragmentary exploded perspective view of a conventional lens device.
Figure 2:
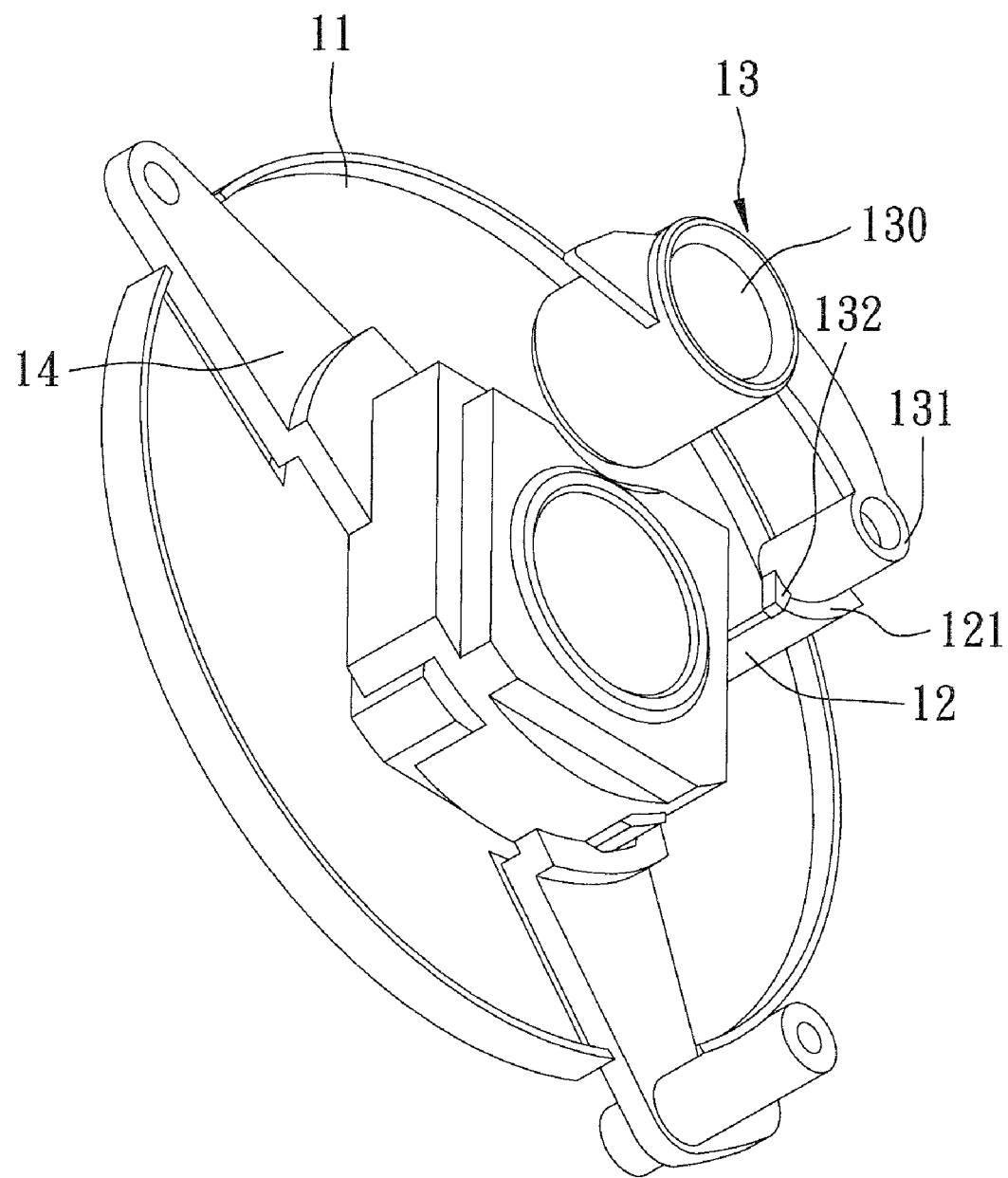
FIG. 2 is a fragmentary assembled perspective view of the conventional lens device.
Figure 3:
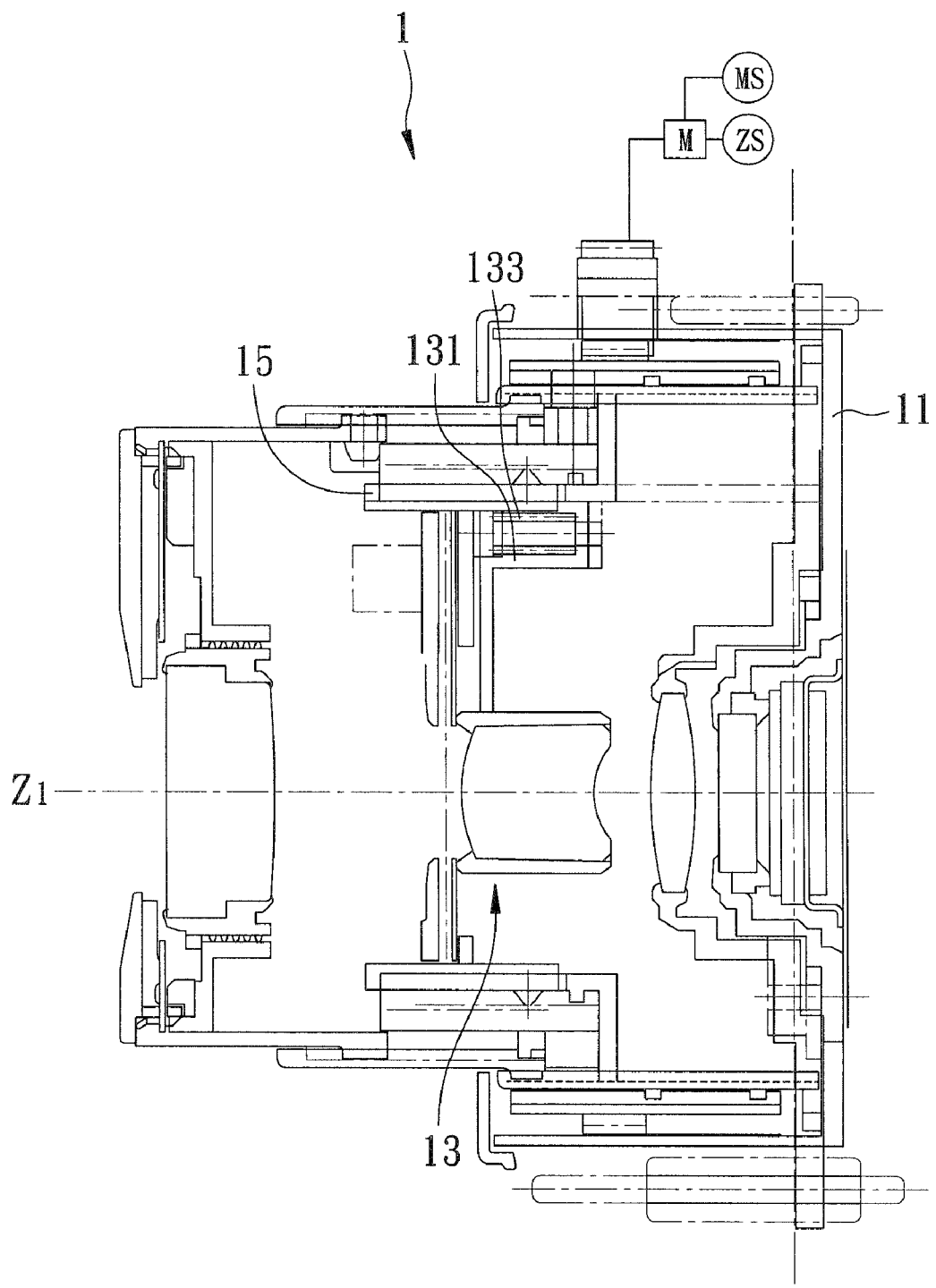
FIG. 3 is a fragmentary assembled schematic view of the conventional lens device.
Figure 4:
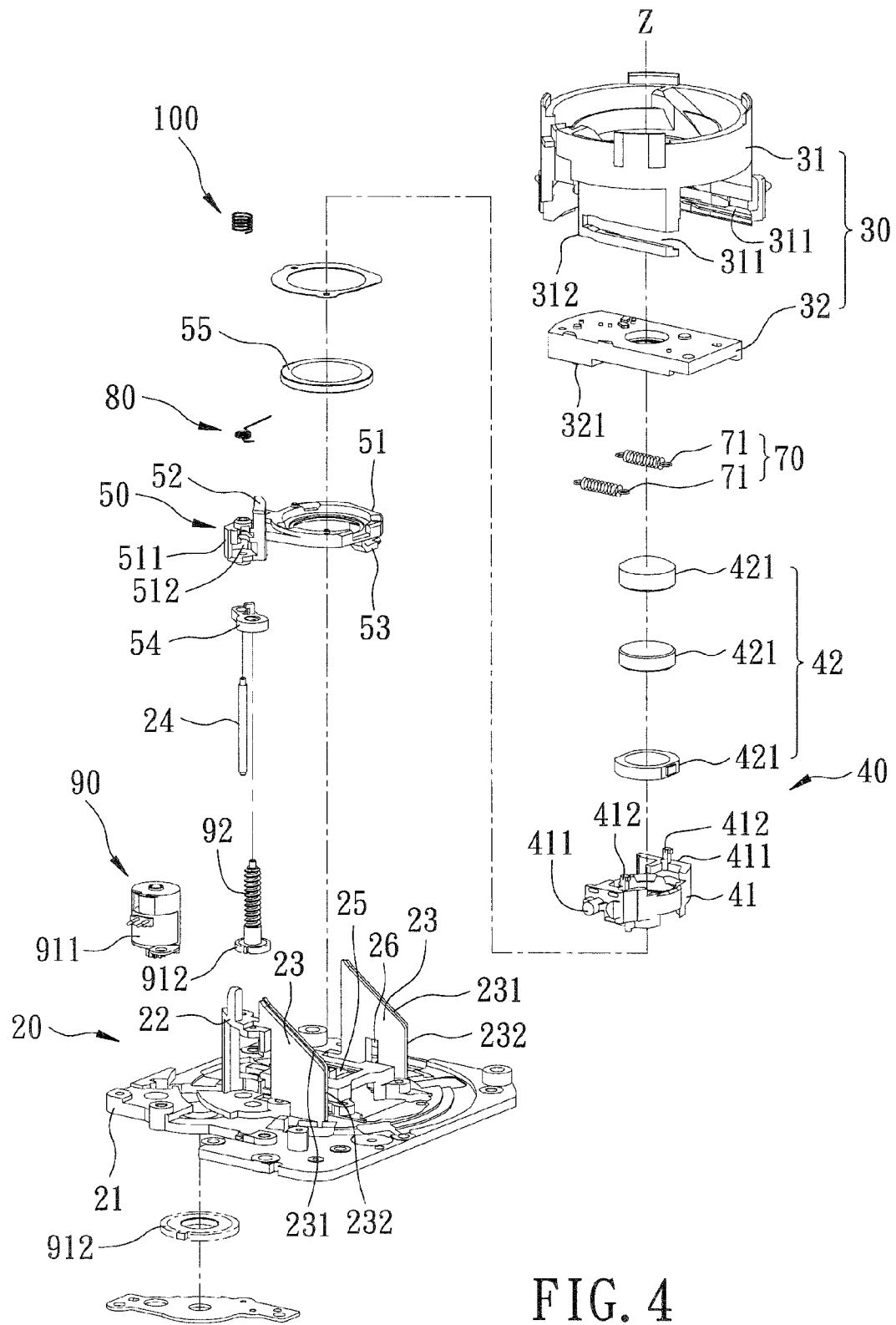
FIG. 4 is a fragmentary exploded perspective view of a preferred embodiment of a lens device according to the invention.
Figure 8:
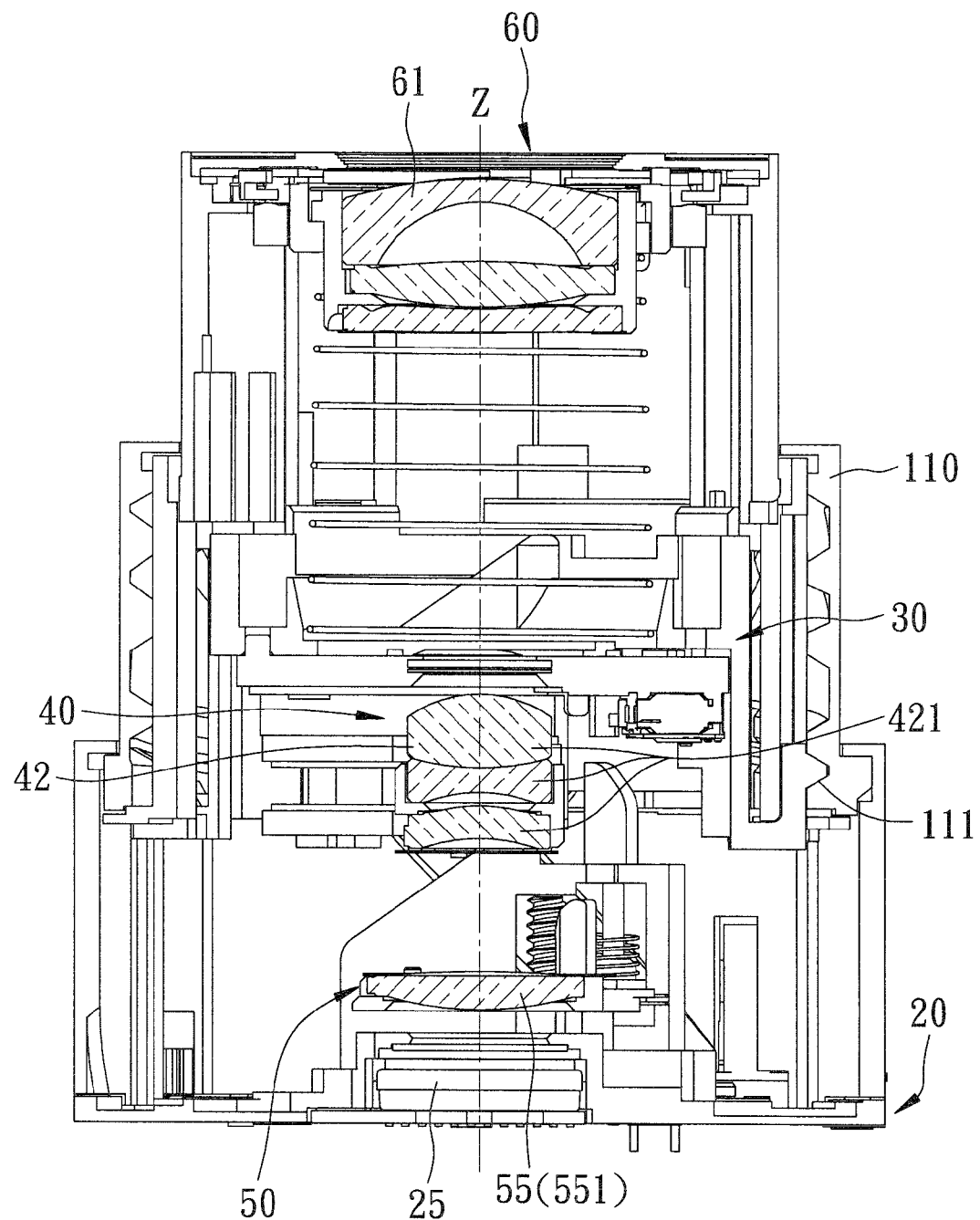
FIG. 8 is an assembled schematic sectional view of the preferred embodiment, illustrating a first barrel unit at an extended position.
Figure 9:
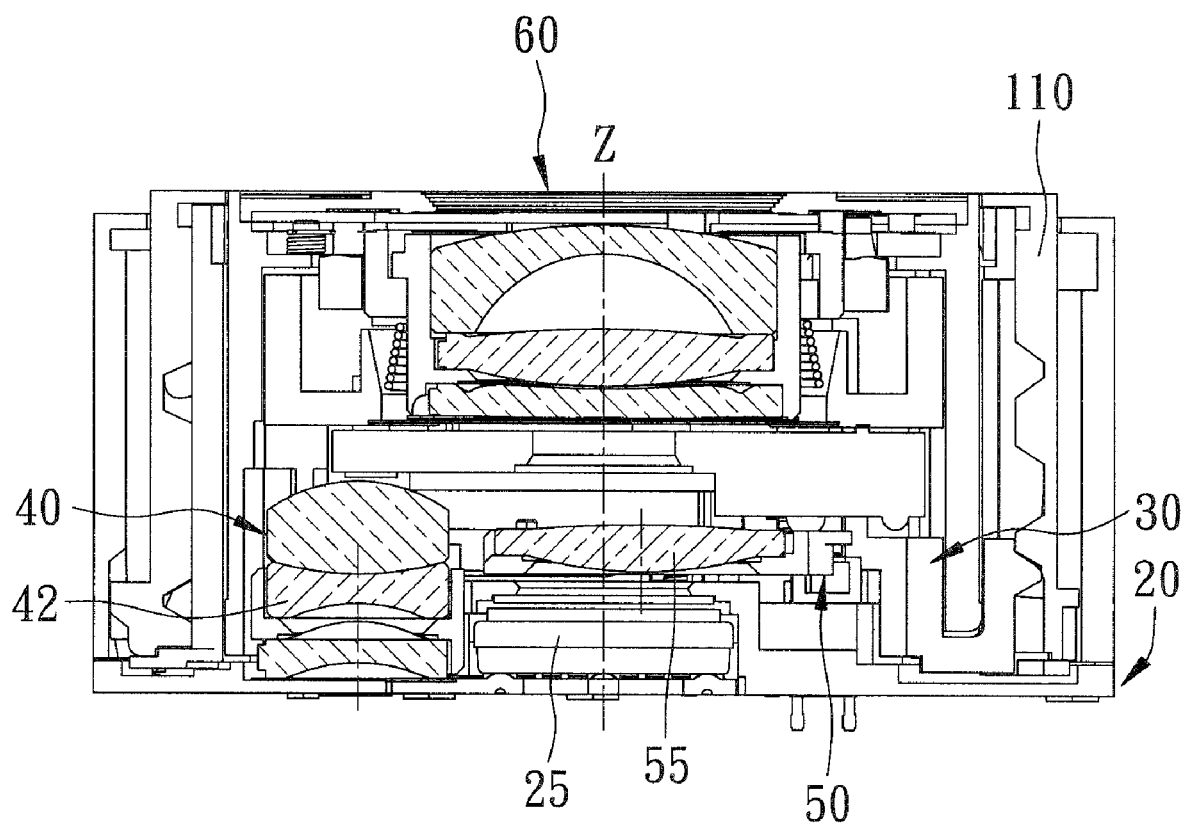
FIG. 9 is another assembled schematic sectional view of the preferred embodiment, illustrating the first barrel unit at a retracted position.
Figure 16:
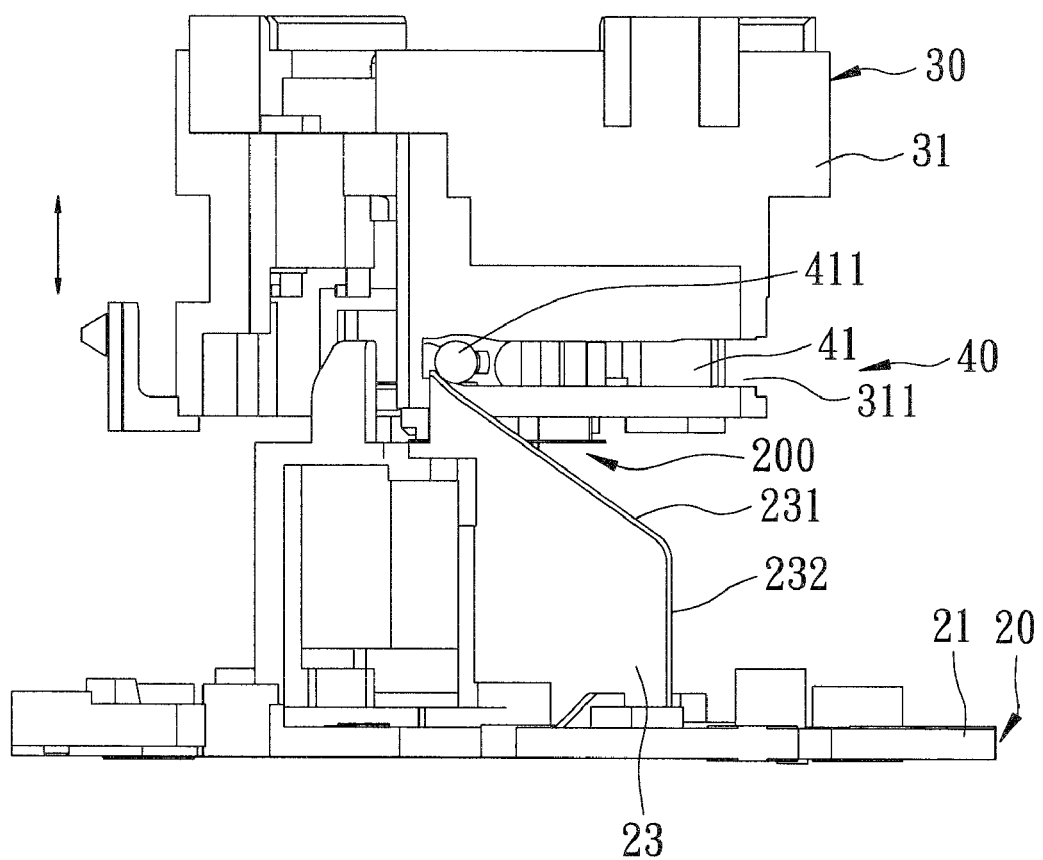
FIG. 16 is still another fragmentary schematic side view of the preferred embodiment, illustrating the first guide mechanism while a guide block abuts against and slides along a first guide surface.

As shown in FIGS. 4, 8 and 9, the preferred embodiment of a lens device according to the present invention is adapted for use with a camera (not shown), and comprises a seat unit 20, a first barrel unit 30, first and second lens modules 40, 50, first and second guide mechanisms 200, 300 (see FIGS. 16 and 12), a front lens module 60, first and second biasing units 70, 80, a driving unit 90, and a backlash compensating component 100.

Figure 5:
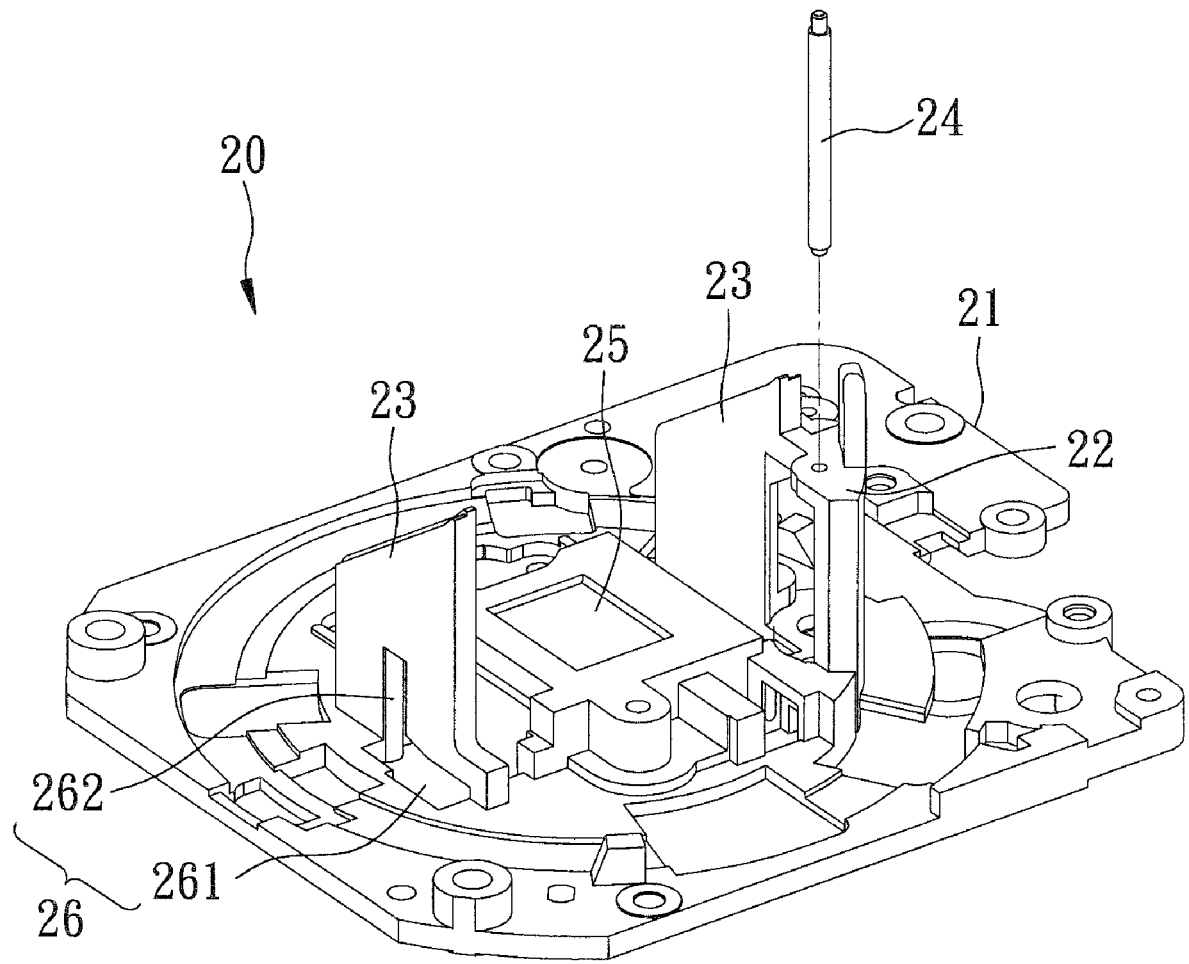
FIG. 5 is an exploded perspective view of a seat unit of the preferred embodiment.

As further shown in FIG. 5, the seat unit 20 has an image sensing component 25 with an optical axis (Z) disposed thereon, and includes a base plate 21 on which the image sensing component 25 is mounted, a pair of spaced apart guide plates 23 disposed on the base plate 21, a pivot pin 24 disposed on the base plate 21 and extending in a direction parallel to the optical axis (Z), and a mounting frame 22 mounted on the base plate 21 and through which the pivot pin 24 extends. The image sensing component 25 senses images and transforms them into signals for subsequent processing.

The first barrel unit 30 is movable relative to the seat unit 20 along the optical axis (Z) between an extended position (see FIG. 8), where the first barrel unit 30 is distal from the image sensing component 25 of the seat unit 20, and a retracted position (see FIG. 9), where the first barrel unit 30 is proximate to the image sensing component 25. The first barrel unit 30 includes a barrel body 31 formed with a pair of parallel guide slots 311, and a shutter 32 disposed in the barrel body 31 and having a first hook portion 321.

Figure 18:
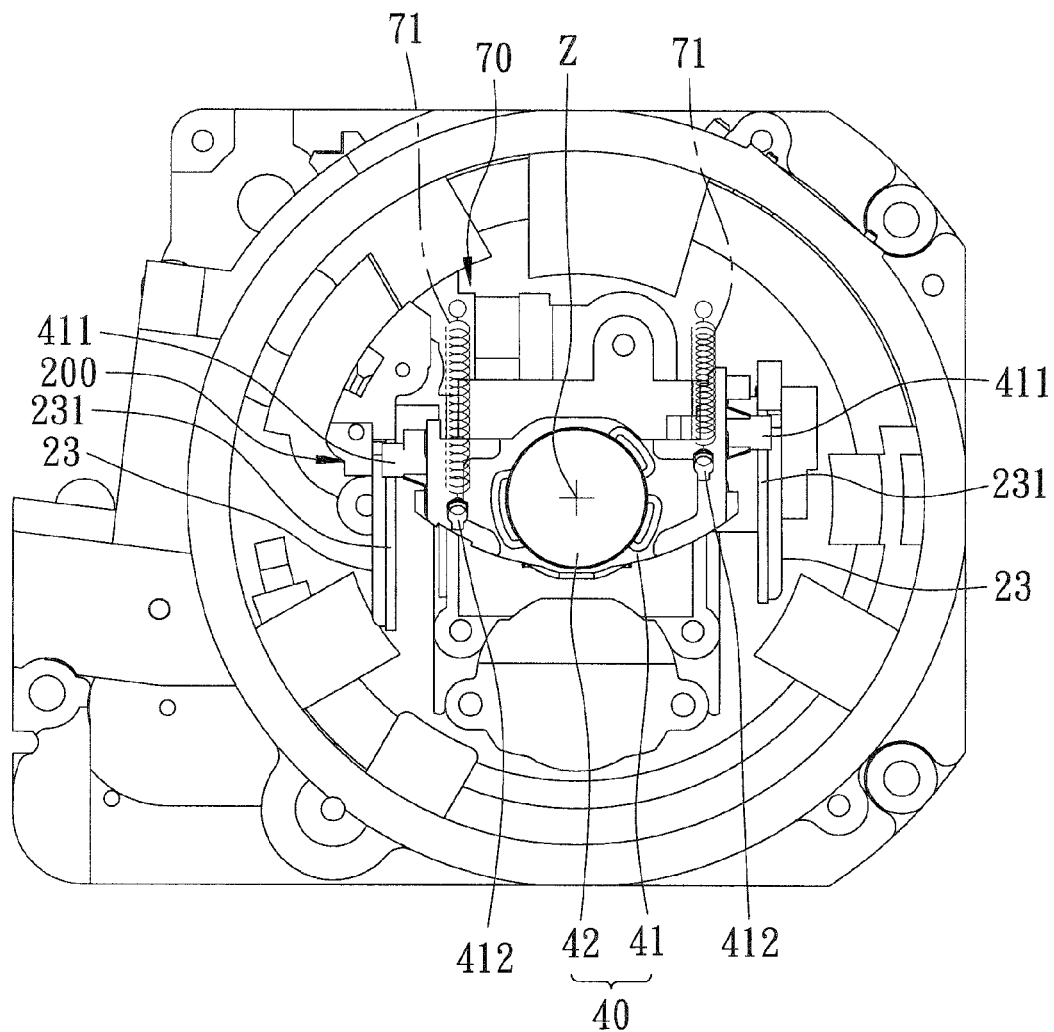
FIG. 18 is still another schematic top view of the preferred embodiment, illustrating the first lens module at a first shooting position.

The first lens module 40 is coupled slidably to the first barrel unit 30, and has a main body 41 that is formed with a second hook portion 412, and a first lens unit 42 that is disposed in the main body 41 and that includes a plurality of first lenses 421. The first lens module 40 is movable in radial directions relative to the optical axis (Z) between a first shooting position (see FIGS. 8 and 18), where the first lens unit 42 is aligned with the image sensing component 25 of the seat unit 20 along the optical axis (Z), and a first retreating position (see FIGS. 9 and 19), where the first lens unit 42 is misaligned with the image sensing component 25 relative to the optical axis (Z).

The first guide mechanism 200 includes a pair of first guide surfaces 231 that are formed respectively at the guide plates 23 of the seat unit 20, and that are disposed on an imaginary plane inclined with respect to the optical axis (Z), and a pair of guide blocks 411 that are provided on the main body 41 of the first lens module 40. The first guide mechanism 200 is disposed for driving movement of the first lens module 40 from the first shooting position to the first retreating position when the first barrel unit 30 moves from the extended position to the retracted position. In this embodiment, each of the guide blocks 411 is slidably retained in a respective one of the guide slots 311 of the barrel body 31 of the first barrel unit 30. Each of the guide plates 23 is further formed with a second guide surface 232 that extends from the respective one of the first guide surfaces 231 toward the base plate 21 of the seat unit 20.

Figure 6:
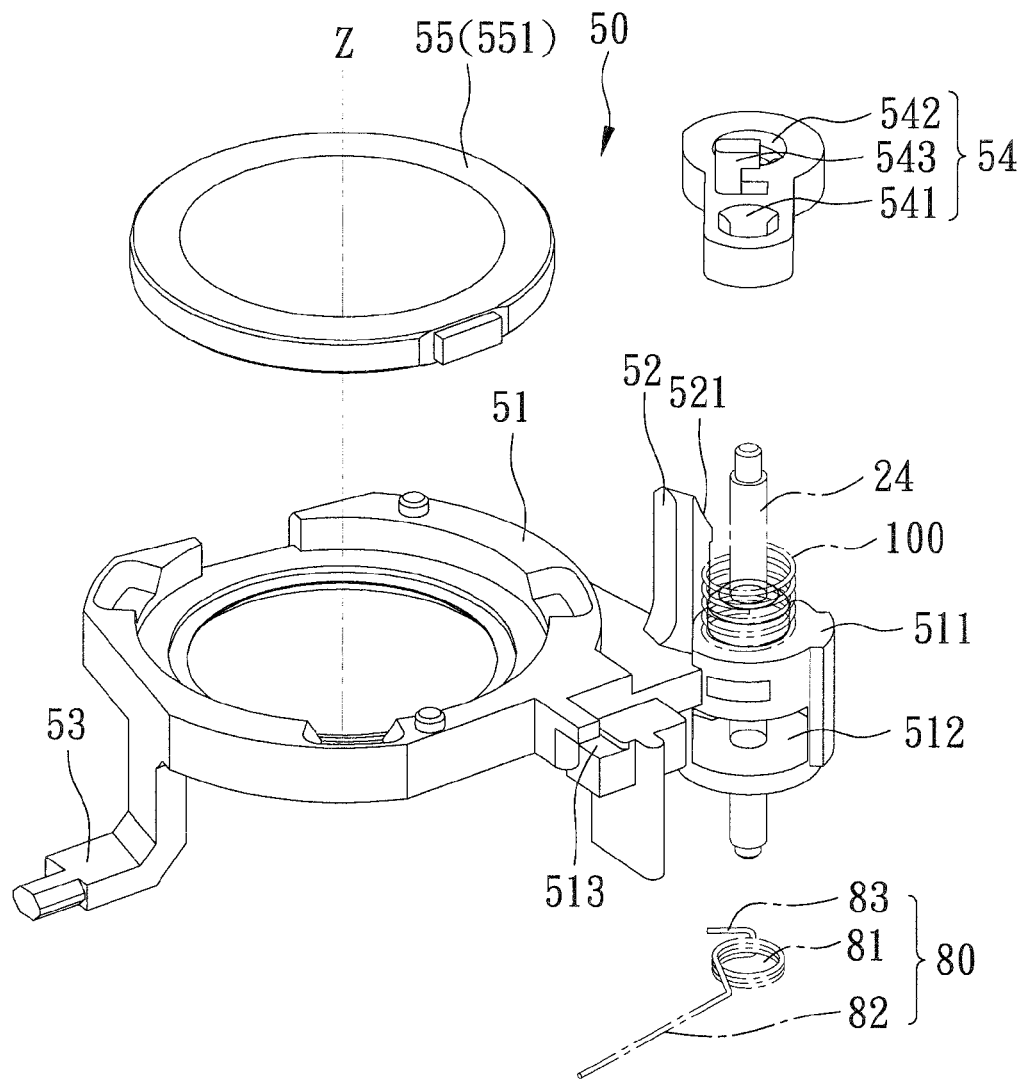
FIG. 6 is an exploded perspective view of a second lens module and a second biasing unit of the preferred embodiment.

As shown in FIG. 6, the second lens module 50 is mounted pivotally on the seat unit 20, and has a frame body 51 formed with a second recess 513, a pivot portion 511 connected to the frame body 51, pivoted on the pivot pin 24 of the seat unit 20, and formed with a first recess 512, a cam post 52 formed on the frame body 51, a guide component 53 connected to the frame body 51, a push plate 54 pivoted on the pivot pin 24, and a second lens unit 55 mounted in the frame body 51 and including a second lens 551. The push plate 54 has a threaded hole portion 542, a pivot hole portion 541 spaced apart from the threaded hole portion 542, received in the first recess 512, and through which the pivot pin 24 extends, and a hook member 543. The second lens module 50 is rotatable between a second shooting position (see FIG. 8), where the second lens unit 55 is aligned with the image sensing component 25 of the seat unit 20 along the optical axis (Z), and a second retreating position (see FIG. 9), where the second lens unit 55 is misaligned with the image sensing component 24 relative to the optical axis (Z).

Figure 10:
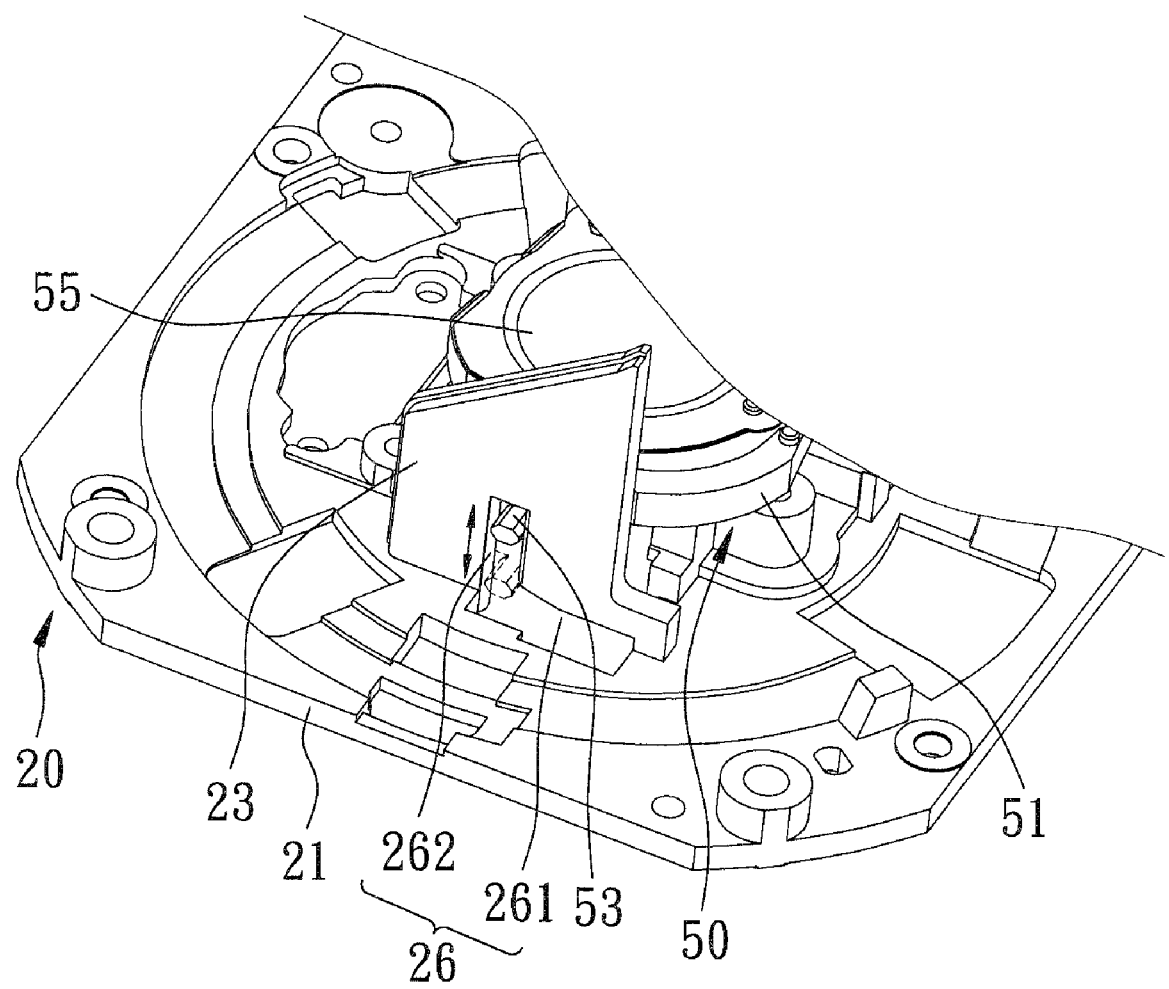
FIG. 10 is a fragmentary assembled perspective view of the preferred embodiment, illustrating a guide component of the second lens module movably disposed in a guide groove during zoom adjustment.
Figure 15:
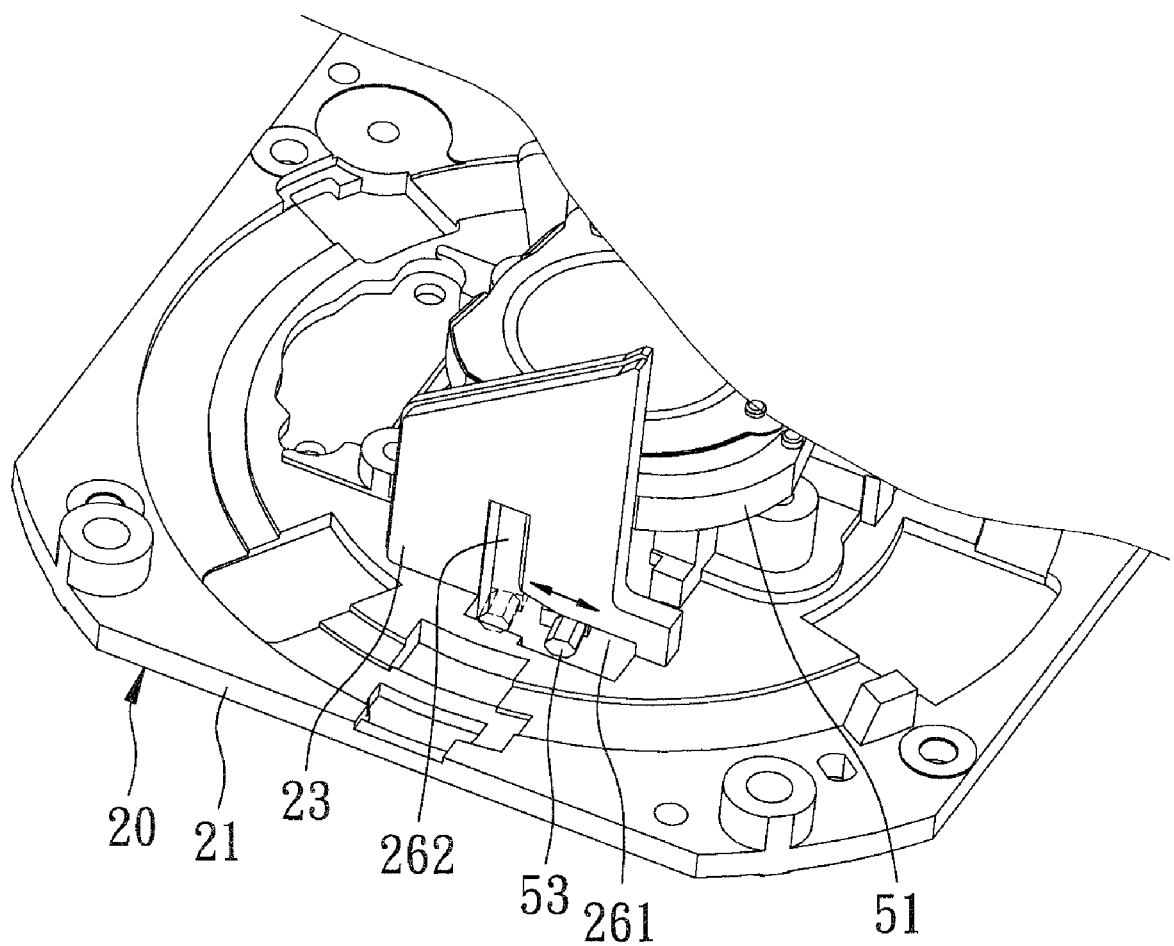
FIG. 15 is a view similar to FIG. 10, but illustrating the guide component movably disposed in the guide groove during the movement of the second lens module between the second shooting position and the second retreating position.

As shown in FIG. 5, the seat unit 20 is formed with a guide groove 26 in one of the guide plates 23 for guiding movement of the guide component 53 of the second lens module 50 therealong. The guide groove 26 has a first groove section 262 that extends parallel to the optical axis (Z), and a second groove section 261 that is transverse to and that is in spatial communication with the first groove section 262, such that the second lens module 50 is movable along the optical axis (Z) when the guide component 53 is disposed in the first groove section 262 (see FIG. 10), and that the second lens module 50 is rotatable between the second shooting position and the second retreating position when the guide component 53 is disposed in the second groove section 261 (see FIG. 15).

Figure 12:
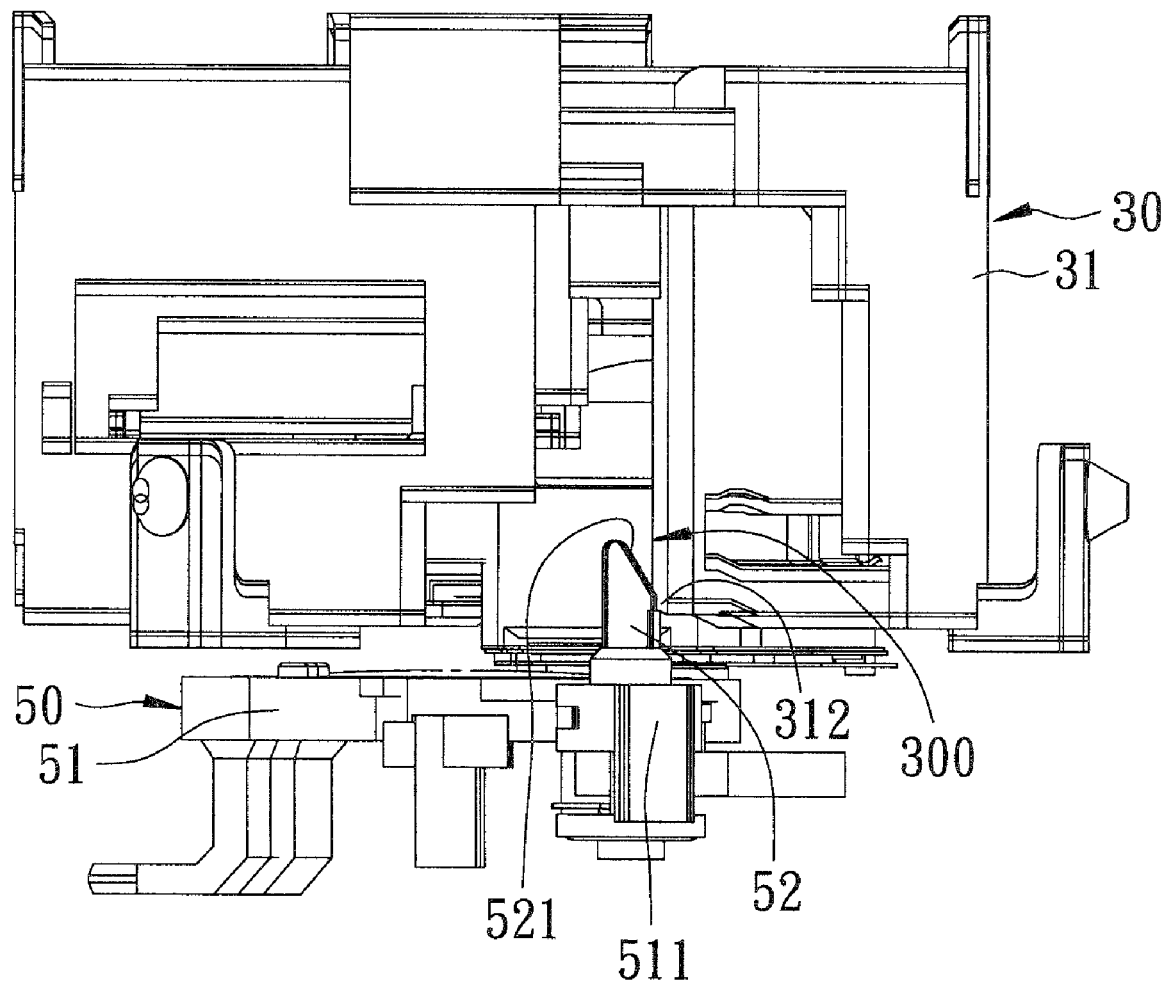
FIG. 12 is another fragmentary schematic side view of the preferred embodiment, illustrating a second mechanism.

As shown in FIG. 12, the second guide mechanism 300 includes a cam surface 521 provided on the cam post 52 of the second lens module 50 (see FIG. 6), and a pushing portion 312 provided on the barrel body 31 of the first barrel unit 30. The second guide mechanism 300 is disposed for driving movement of the second lens module 50 from the second shooting position to the second retreating position when the first barrel unit 30 moves from the extending position to the retracted position.

As shown in FIG. 8, the front lens module 60 is disposed at one end of the first barrel unit 30 opposite to the image sensing component 25 of the seat unit 20, and includes a front lens unit 61.

In this embodiment, the first biasing unit 70 includes a pair of spaced apart extension springs 71, each of which has opposite ends coupled respectively to the first hook portion 321 of the shutter 32 of the first barrel unit 30 and the second hook portion 412 of the main body 41 of the first lens module 40 for biasing the first lens module 40 to the first shooting position.

Figure 7:
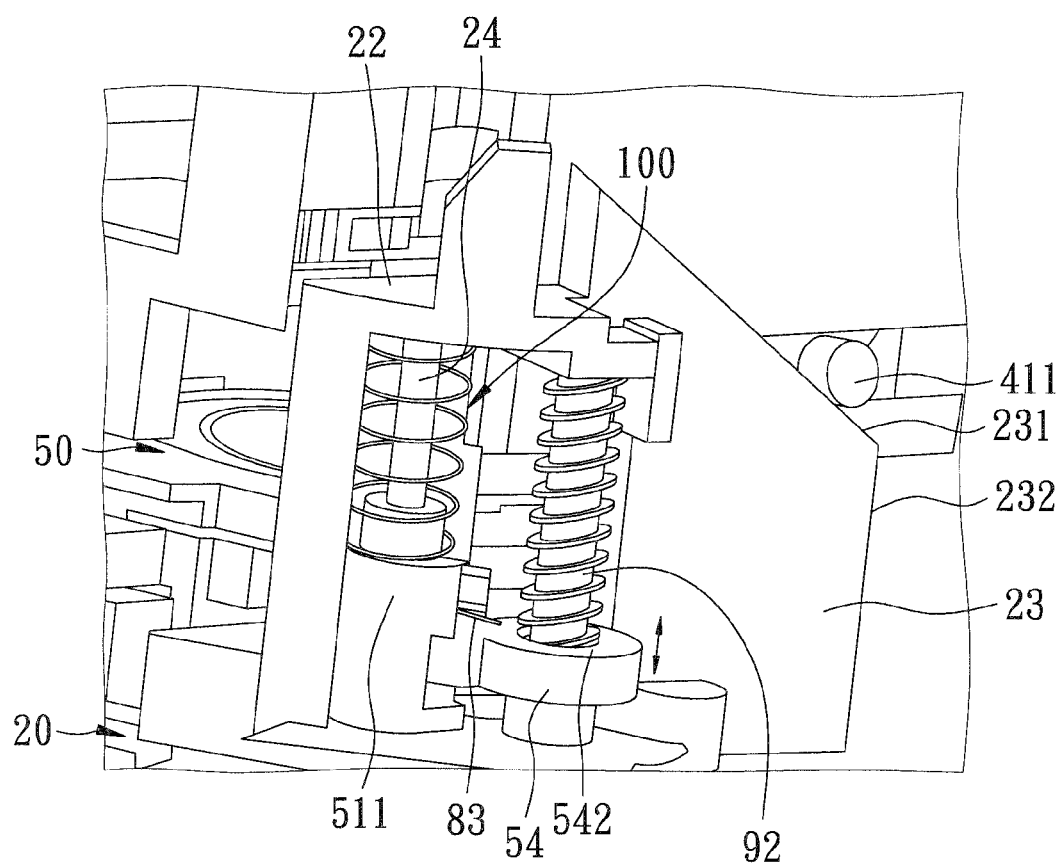
FIG. 7 is a fragmentary assembled perspective view of the preferred embodiment, illustrating a threaded component and a backlash compensating component.

As shown in FIGS. 4, 6 and 7, the second biasing unit 80 is a torsion spring in this embodiment, and has a central coil portion 81 through which the pivot pin 24 of the seat unit 20 extends, a first distal section 82 that abuts against the frame body 51 of the second lens module 50 in the second recess 513, and a second distal section 83 that abuts against the hook member 543 of the push plate 54 of the second lens module 50. The second biasing unit 80 is disposed for biasing the second lens module 50 to the second shooting position.

The driving unit 90 includes a drive motor 911, a speed reduction gear unit 912 coupled to and driven by the drive motor 911, and a threaded component 92 disposed rotatably on the base plate 21 of the seat unit 20, extending parallel to the optical axis (Z), meshing with the speed reduction gear unit 912, engaging threadedly the threaded hole portion 542 in the push plate 54 of the second lens module 50 (see FIG. 7), and extending through the mounting frame 22 of the seat unit 20. In this embodiment, the backlash compensating component 100 includes a compression spring disposed between the pivot portion 511 of the frame body 51 of the second lens module 50 and the mounting frame 22 of the seat unit 20 for compensating the backlashes among the second lens module 50, the threaded component 92, and the seat unit 20.

In use, the drive motor 90 is operable to drive rotation of the threaded component 92 via the speed reduction gear unit 912 when the second lens unit 55 of the second lens module 50 is at the second shooting position, such that the push plate 54 of the second lens module 50 is movable along the threaded component 92 so as to move the second lens unit 55 along the optical axis (Z) for focus adjustment (see FIG. 7). At the same time, the guide component 53 of the second lens module is movable together with the second lens module 50 through guidance of the first groove section 262 of the guide groove 26 in the guide plate 23 of the seat unit 20 (see FIG. 10).

Figure 11:
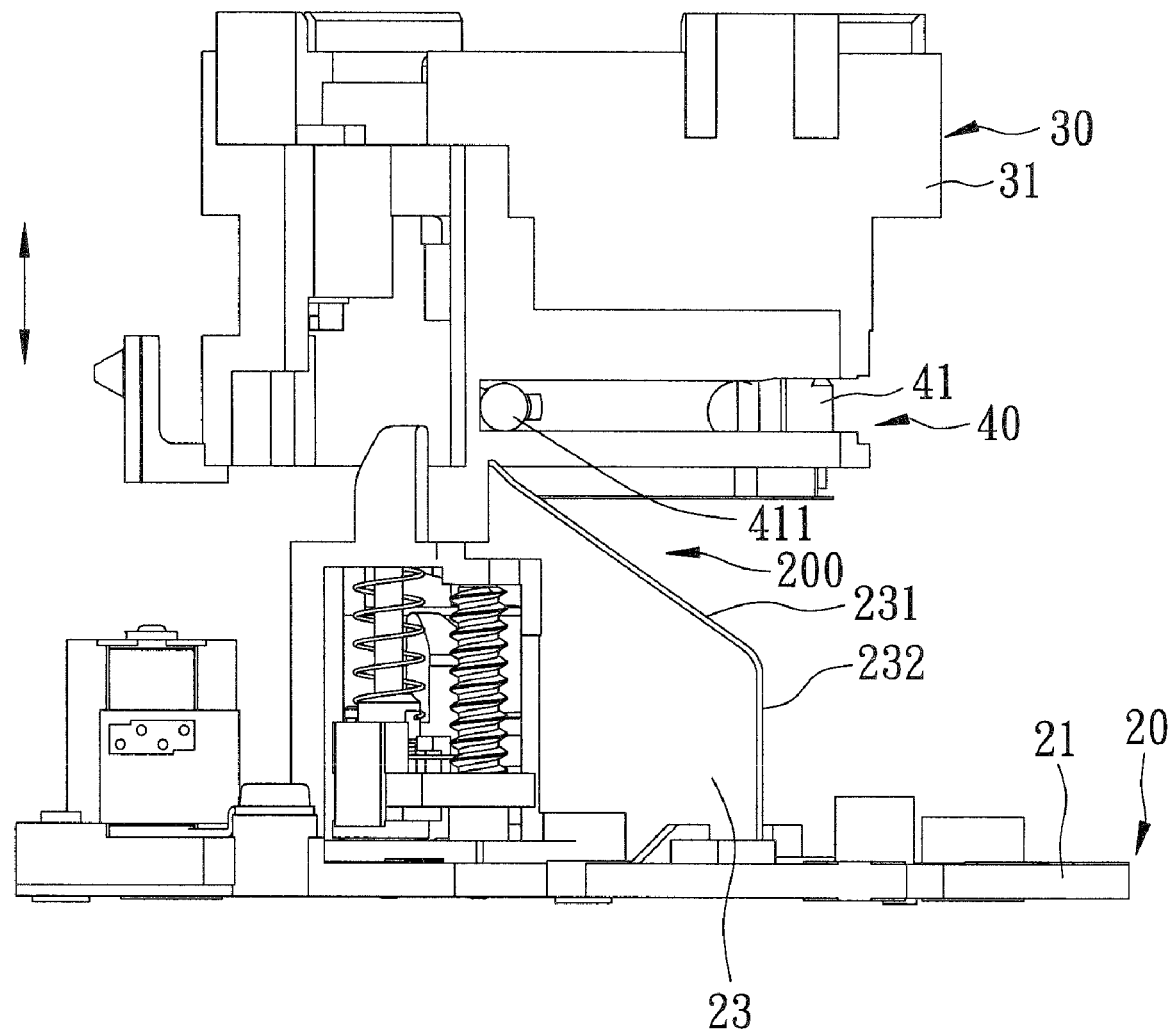
FIG. 11 is a fragmentary schematic side view to illustrate focus adjustment of the preferred embodiment.

As shown in FIG. 8, when the first lens module 40 is at the first shooting position while the second lens module 50 is at the second shooting position, rotation of a rotatable barrel 110 of the camera about the optical axis (Z) drives movement of the first barrel unit 30 together with the front lens module 60 and the first lens module 40 relative to the image sensing component 25 of the seat unit 20 along the optical axis (Z) via a cam groove 111 formed on the rotatable barrel 110 for zoom adjustment. As further shown in FIG. 11, during the aforementioned process of zoom adjustment, the guide blocks 411 of the first guide mechanism 200 do not contact the first guide surfaces 231 of the first guide mechanism 200 and the second guide surfaces 232 of the guide plates 23 of the seat unit 20, i.e., there is no relative movement between the first barrel unit 30 and the first lens module 40 during zoom adjustment.

Figure 13:
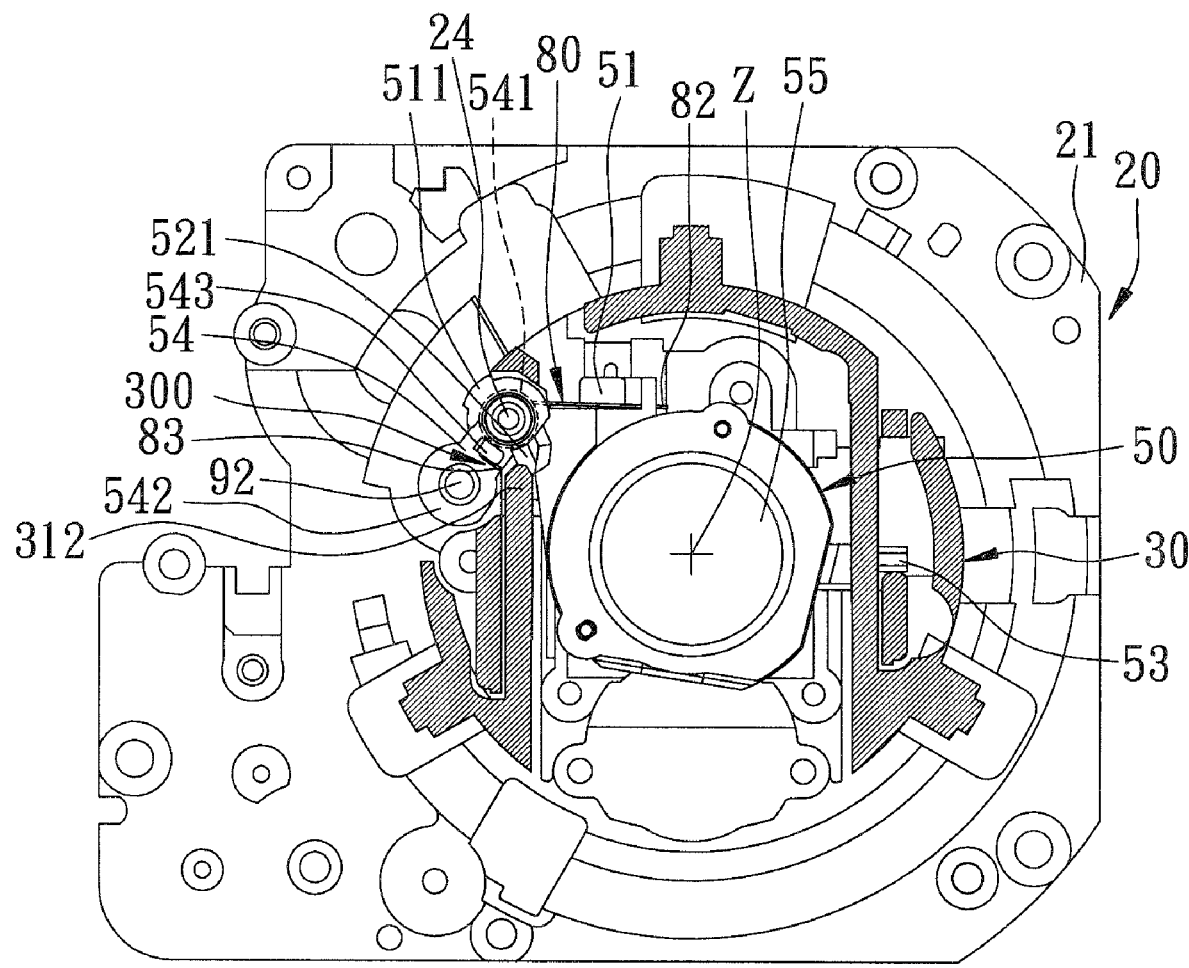
FIG. 13 is a schematic sectional top view of the preferred embodiment, illustrating a second lens unit of the second lens module at a second shooting position.
Figure 14:
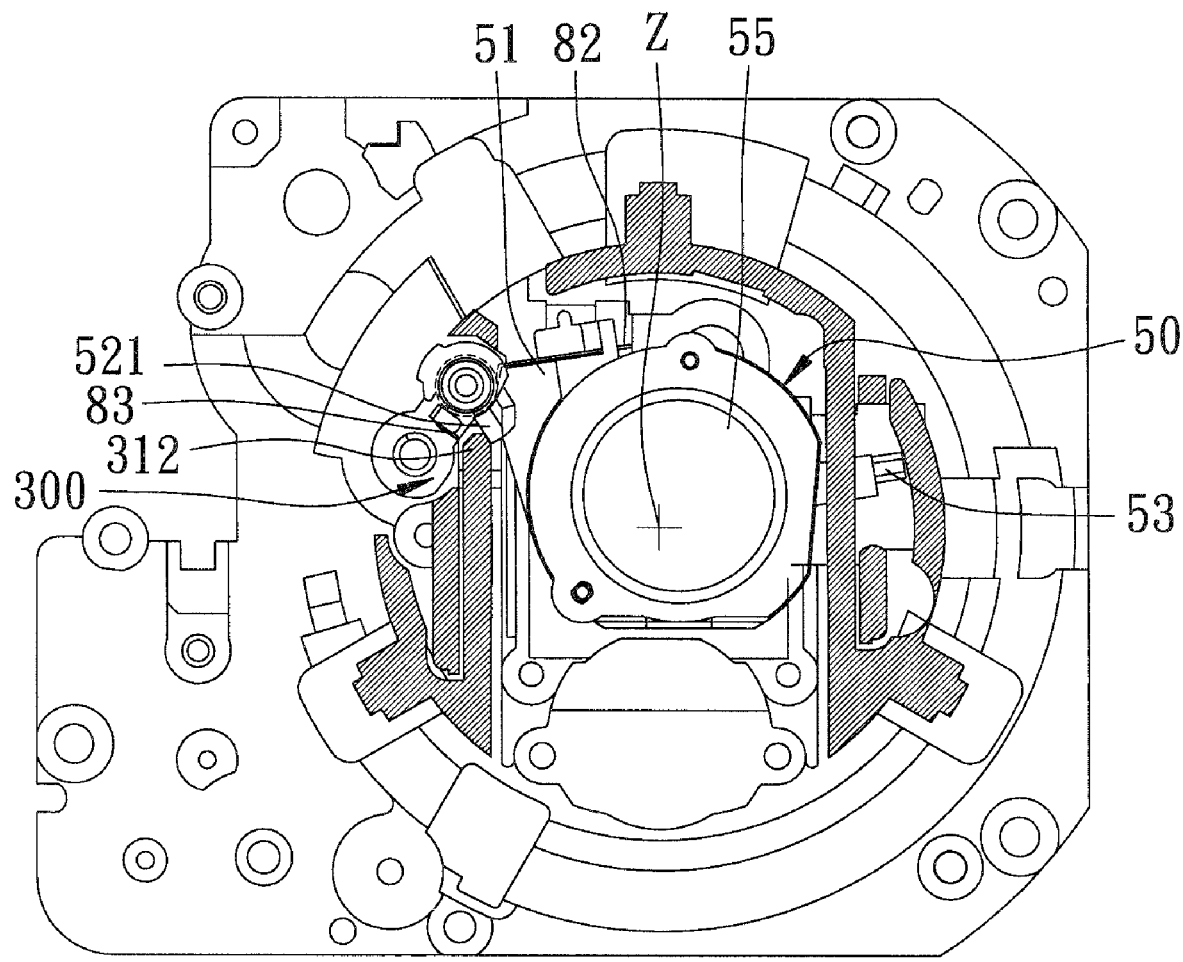
FIG. 14 is a view similar to FIG. 13, but illustrating the second lens unit at a second retreating position.

As shown in FIGS. 12 to 14, when the camera is turned off, the pushing portion 312 of the second guide mechanism 300 abuts against the cam surface 521 when the first barrel unit 30 moves from the extended position to the retracted position, thereby resulting in movement of the second lens module 50 from the second shooting position (see FIG. 13) to the second retreating position (see FIG. 14). Since the first distal section 82 abuts against the frame body 51, and since the rotation of the second lens module 50 twists the second biasing unit 80, the second biasing unit 80 will accumulate a restoring force for biasing the second lens module 50 from the second retreating position to the second shooting position. Simultaneously, the guide component 53 of the second lens module 50 is movable together with the second lens module 50 through guidance of the second groove section 261 of the guide groove 26 in the guide plate 23 of the seat unit 20 (see FIG. 15).

Figure 17:
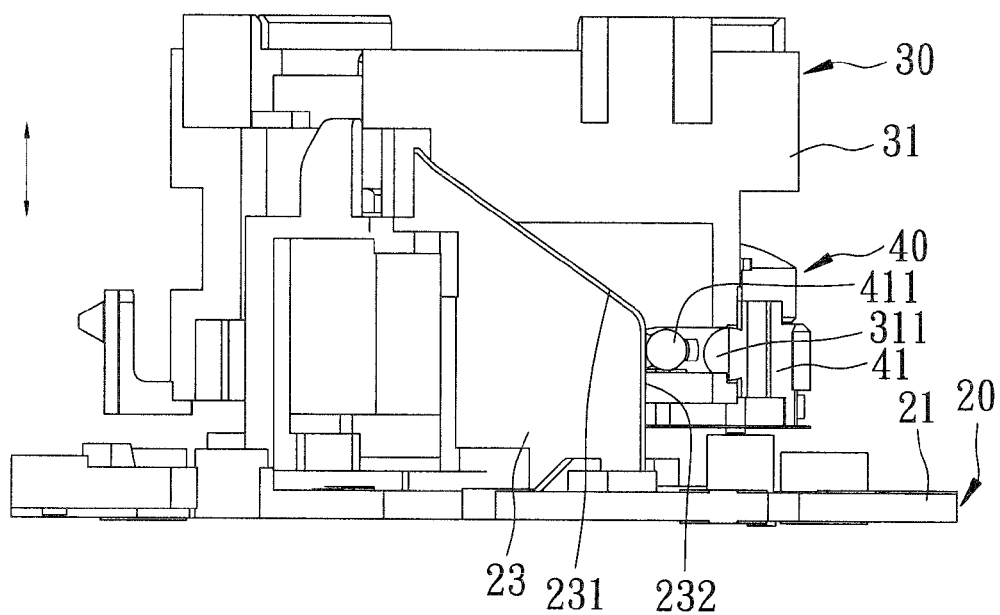
FIG. 17 is yet another fragmentary schematic side view of the preferred embodiment, illustrating the guide block abutting against and sliding along a second guide surface.
Figure 19:
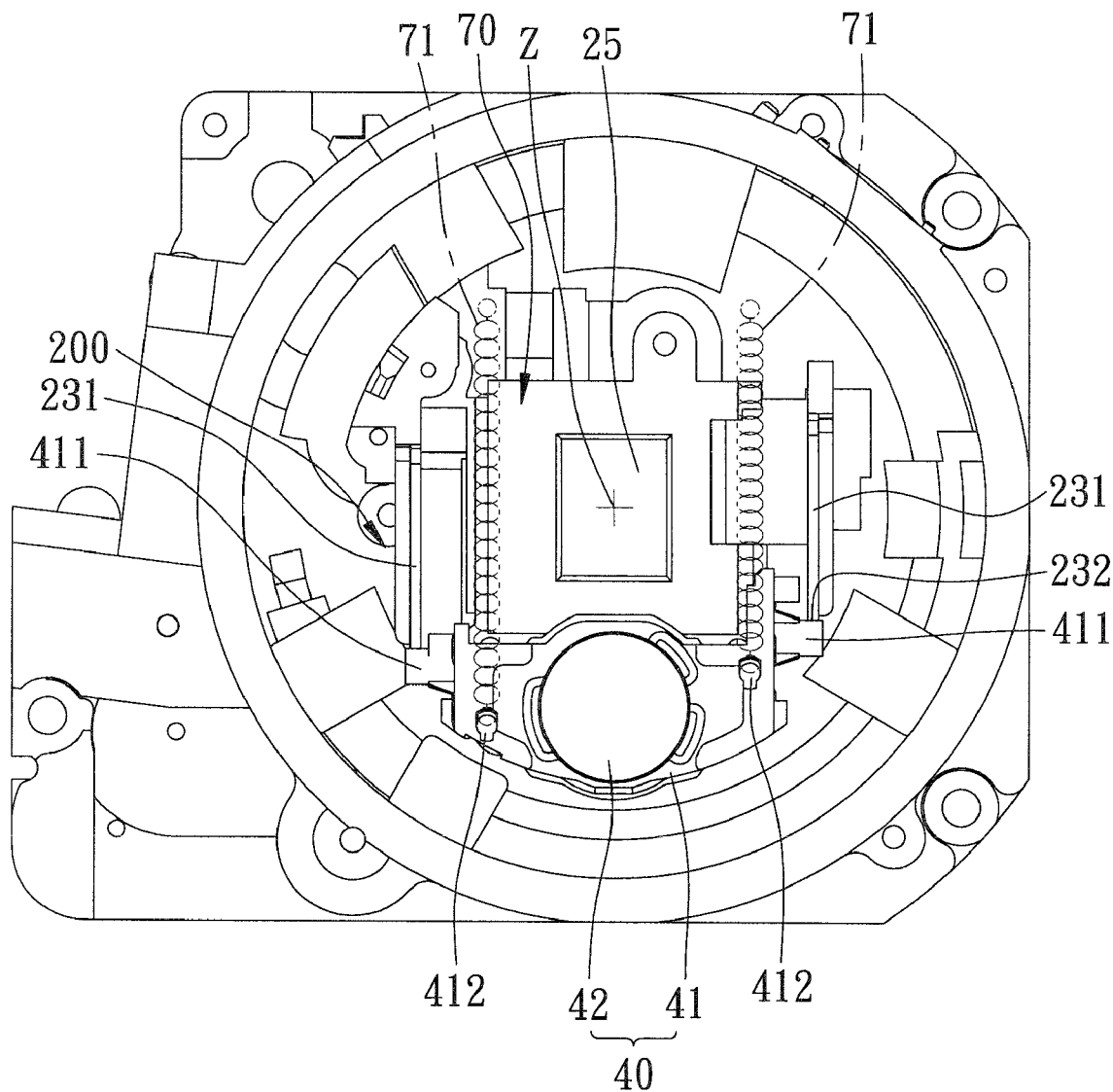
FIG. 19 is yet another schematic top view of the preferred embodiment, illustrating the first lens module at a first retreating position.

In this embodiment, during the rotation of the second lens module 50 from the second shooting position to the second retreating position, the guide blocks 411 of the first guide mechanism 200 respectively abut against and slide along the first guide surfaces 231 of the first guide mechanism 200 (see FIG. 16) and the second guide surfaces 232 of the guide plates 23 of the seat unit 20 (see FIG. 17) when the first barrel unit 30 moves from the extended position to the retracted position, thereby resulting in movement of the first lens module 40 from the first shooting position (see FIG. 18) to the first retreating position (see FIG. 19). Since the movement of the first lens module 50 stretches the extension springs 71 of the first biasing unit 70, the extension springs 71 will accumulate a restoring force for biasing the first lens module 40 from the first retreating position to the first shooting position.

Compared to the prior art, the movements of the first and second lens modules 40, 50 in this invention make more room when the first barrel unit 30 moves from the extended position to the retracted position, so as to permit the first barrel unit 30 to move closer to the base plate 21 of the seat unit 20, thereby resulting in a thinner size after retraction. Moreover, during the focus adjustment, the second lens module 50 can move stably along the optical axis (Z) due to guiding of the guide component 53 by the first groove section 262 of the guide groove 26, thereby promoting the focusing quality.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens device comprising:
   a seat unit having an image sensing component with an optical axis disposed thereon;
   a first barrel unit movable relative to said seat unit along the optical axis between an extended position, where said first barrel unit is distal from said image sensing component, and a retracted position, where said first barrel unit is proximate to said image sensing component;
   a first lens module coupled slidably to said first barrel unit and having a first lens unit, said first lens module being movable in radial directions relative to the optical axis between a first shooting position, where said first lens unit is aligned with said image sensing component along the optical axis, and a first retreating position, where said first lens unit is misaligned with said image sensing component relative to the optical axis;
   a first guide mechanism provided on said seat unit and said first lens module for driving movement of said first lens module from the first shooting position to the first retreating position when said first barrel unit moves from the extended position to the retracted position;
   a first biasing unit coupled between said first barrel unit and said first lens module for biasing said first lens module to the first shooting position;
   a second lens module mounted pivotally on said seat unit, having a second lens unit, and rotatable between a second shooting position, where said second lens unit is aligned with said image sensing component along the optical axis, and a second retreating position, where said second lens unit is misaligned with said image sensing component relative to the optical axis;
   a second guide mechanism provided on said first barrel unit and said second lens module for driving rotation of said second lens module from the second shooting position to the second retreating position when said first barrel unit moves from the extended position to the retracted position; and
   a second biasing unit coupled to said second lens module for biasing said second lens module to the second shooting position.

2. The lens device as claimed in claim 1, wherein said first guide mechanism includes:

a pair of first guide surfaces provided on said seat unit, spaced apart from each other, and disposed on an imaginary plane that is inclined with respect to the optical axis; and a pair of guide blocks provided on said first lens module, said guide blocks respectively abutting against and sliding along said first guide surfaces when said first barrel unit moves from the extended position to the retracted position, thereby resulting in movement of said first lens module from the first shooting position to the first retreating position.

3. The lens device as claimed in claim 2, wherein said first barrel unit is formed with a pair of guide slots, each of said guide blocks being slidably retained in a respective one of said guide slots.

4. The lens device as claimed in claim 2, wherein said second guide mechanism includes a cam surface provided on said second lens module, and a pushing portion provided on said first barrel unit and abutting against said cam surface when said first barrel unit moves from the extended position to the retracted position, thereby resulting in movement of said second lens module from the second shooting position to the second retreating position.

5. The lens device as claimed in claim 4, wherein said seat unit includes a base plate on which said image sensing component is mounted, and a pair of spaced apart guide plates disposed on said base plate, each of said guide plates being formed with a respective one of said first guide surfaces and being further formed with a second guide surface that extends from the respective one of said first guide surfaces toward said base plate.

6. The lens device as claimed in claim 5, wherein said seat unit further includes a pivot pin disposed on said base plate and extending in a direction parallel to the optical axis, said second lens module further having a frame body mounted with said second lens unit, a pivot portion connected to said frame body and pivoted on said pivot pin, and a cam post formed on said frame body and formed with said cam surface of said second guide mechanism.

7. The lens device as claimed in claim 6, further comprising a driving unit for driving movement of said second lens module along the optical axis when said second lens module is at the second shooting position, said second lens module further having a guide component that is connected to said frame body, said seat unit being formed with a guide groove in one of said guide plates for guiding movement of said guide component therealong, said guide groove having a first groove section that extends parallel to the optical axis, and a second groove section that is transverse to and that is in spatial communication with said first groove section, said second lens module being movable along the optical axis when said guide component is disposed in said first groove section, and being rotatable between the second shooting position and the second retreating position when said guide component is disposed in said second groove section.

8. The lens device as claimed in claim 7, wherein:
said second lens module further has a push plate pivoted on said pivot pin of said seat unit, said push plate having a threaded hole portion;
said driving unit including a drive motor, a speed reduction gear unit coupled to and driven by said drive motor, and a threaded component disposed rotatably on said base plate, extending parallel to the optical axis, meshing with said speed reduction gear unit, and engaging threadedly said threaded hole portion in said push plate;
said drive motor being operable to drive rotation of said threaded component via said speed reduction gear unit when said second lens unit of said second lens module is at the second shooting position, such that said push plate is movable along said threaded component so as to move said second lens module along the optical axis.

9. The lens device as claimed in claim 8, wherein:
said pivot portion of said frame body of said second lens module is formed with a first recess;
said frame body is further formed with a second recess;
said push plate further having a pivot hole portion spaced apart from said threaded hole portion, received in said first recess, and through which said pivot pin extends, and a hook member;
said second biasing unit being a torsion spring having a central coil portion through which said pivot pin extends, a first distal section that abuts against said frame body in said second recess, and a second distal section that abuts against said hook member of said push plate.

10. The lens device as claimed in claim 9, wherein said seat unit further includes a mounting frame that is mounted on said base plate and through which said pivot pin and said threaded component extend, said lens device further comprising a backlash compensating component including a compression spring disposed between said pivot portion of said second lens module and said mounting frame.

11. The lens device as claimed in claim 1, wherein:
said first barrel unit includes a barrel body, and a shutter that is disposed in said barrel body and that has a first hook portion;
said first lens module further has a second hook portion; and
said first biasing unit has opposite ends coupled respectively to said first and second hook portions.

12. The lens device as claimed in claim 11, wherein said first biasing unit includes an extension spring.

13. The lens device as claimed in claim 1, further comprising a front lens module disposed at one end of said first barrel unit opposite to said image sensing component and including a front lens unit.

14. The lens device as claimed in claim 13, wherein said first barrel unit is movable together with said front lens module and said first lens module relative to said image sensing component along the optical axis for zoom adjustment.

* * * * *